April 28, 1964 S. W. TONKIN ETAL 3,130,946
FLIGHT CONTROL OF AIRCRAFT
Filed March 13, 1963 3 Sheets-Sheet 1
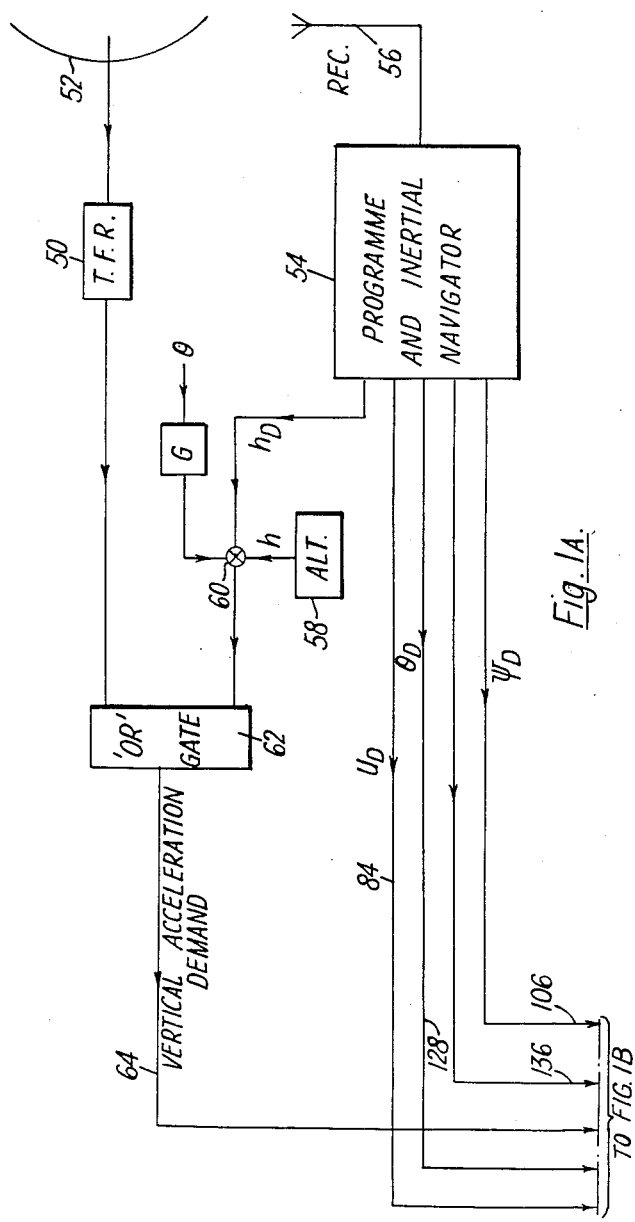
Fig. IA.
Inventors
STEPHEN WILLIAM TONKIN
ROY PEDLAR
By
Bailey, Stephens & Beatty
Attorneys.

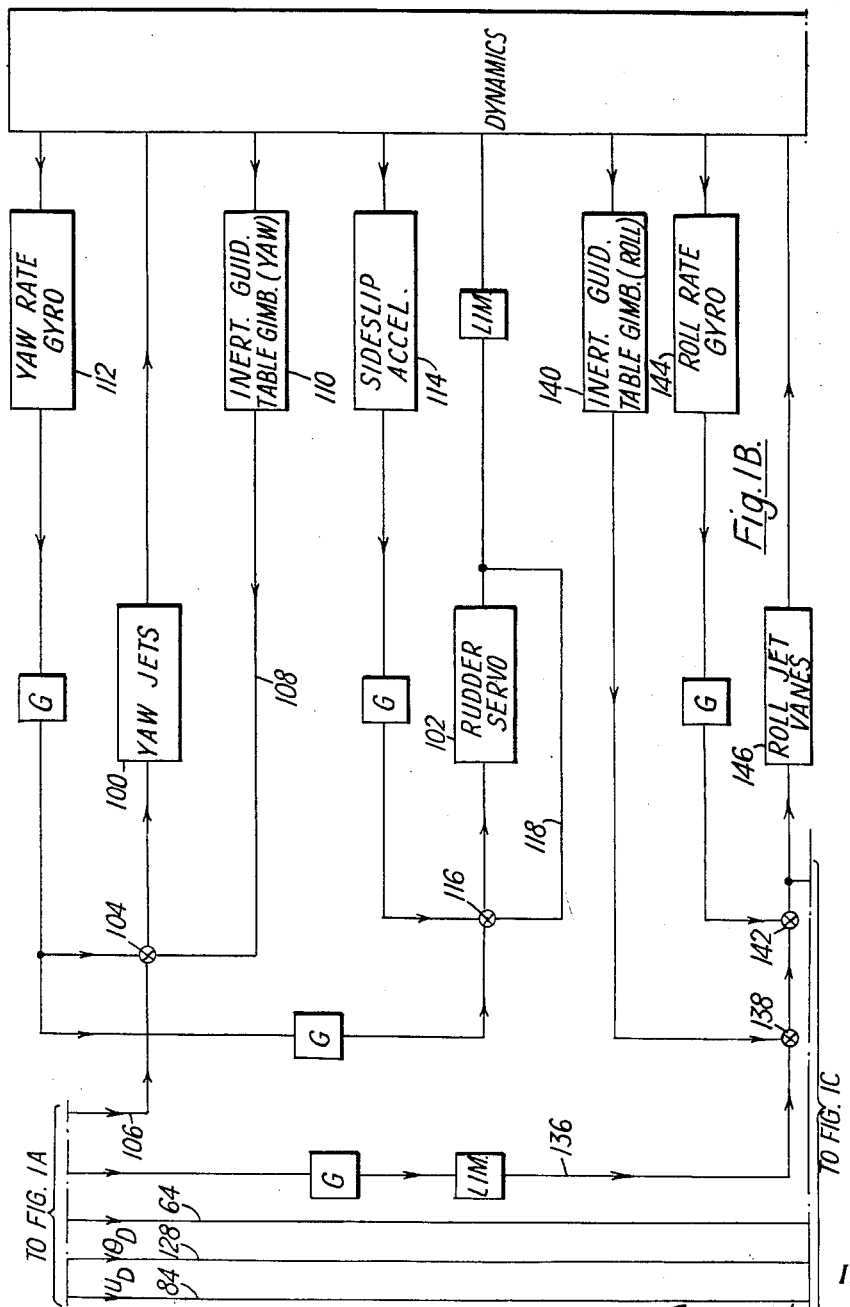
Fig. IB.

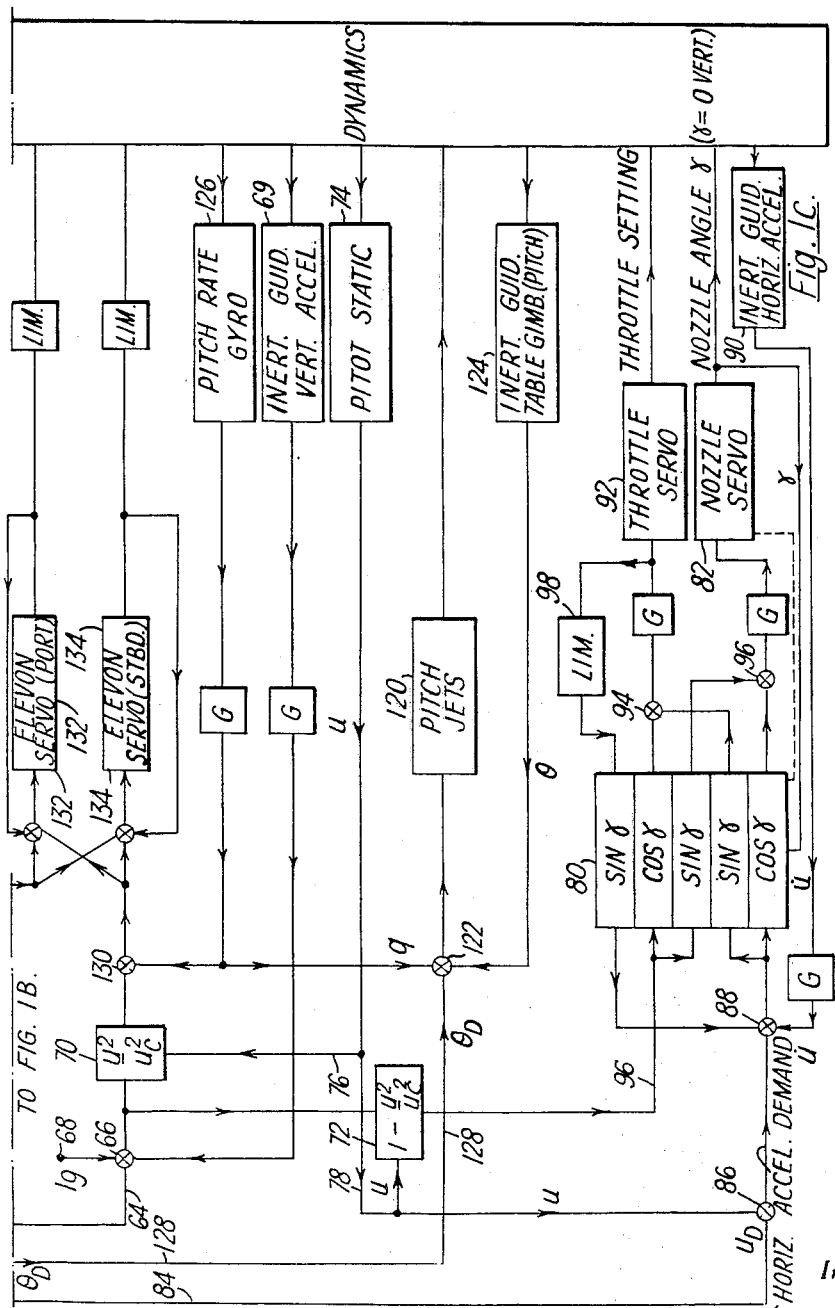

United States Patent Office 3,130,946
Patented Apr. 28, 1964

3,130,946
FLIGHT CONTROL OF AIRCRAFT
Stephen William Tonkin and Roy Pedlar, London, England, assignors to Bristol Aircraft Limited, London, England, a British company
Filed Mar. 13, 1963, Ser. No. 264,947
Claims priority, application Great Britain Mar. 16, 1962
5 Claims. (Cl. 244—77)

This invention relates to the control of aircraft powered by jet engines with rotatable nozzles to permit hovering or forward flight. The invention can be applied to manned or unmanned aircraft capable of vertical take-off and landing.

Such an aircraft will be required to undergo longitudinal acceleration to pass from the hovering condition to the condition of forward flight and vice versa. According to the present invention, the craft is provided with proportioning means whereby demands for horizontal and vertical accelerations are met partly by altering the direction of a rotatable nozzle and partly by varying the thrust of the engine supplying the nozzle, the proportions of these two parts varying as a function of the instantaneous angle of the nozzle in such a manner that in the hover condition horizontal acceleration is achieved predominantly by alteration of the nozzle angle and vertical acceleration by increasing the thrust and when approaching cruising speed horizontal acceleration is achieved predominantly by variation of thrust and vertical acceleration predominantly by variation of the nozzle angle. Normally, two or more nozzles would be used, as this would provide a number of advantages including greater flexibility of control.

In order that the invention may be better understood an example will now be described with reference to the accompanying drawings, FIGURES 1A, 1B and 1C of which show diagrammatically the control system for a pilotless aircraft capable of vertical take-off and landing and powered by jet engines with rotatable nozzles.

In the following example, longitudinal flight is defined in relation to a reference datum on the aircraft itself and means flight in the direction of the fore-and-aft axis of the aircraft in whatever direction it may be pointing. Horizontal and vertical flight are defined in relation to a datum not related to the aircraft itself and mean flight parallel to and normal to the earth's surface, respectively.

Referring now to the drawing, in which the units G and LIM are gain and demand-limiting devices respectively, the aircraft carries a terrain-following radar system 50 having a radar aerial 52 and a flight programme unit and inertial navigator 54 connected to a receiving aerial 56 from which it receives command guidance and correction signals. It also carries a radio altimeter 58.

Demands for vertical acceleration are obtained from a combination of the radio altimeter 58, the terrain-following radar system 50 and the programme unit 54. The output signals from the radio altimeter and the programme unit are differenced in a summing amplifier 60, the output of which is applied to an "OR" gate 62. The "OR" gate also receives an input signal from the terrain-following radar equipment 50 so that a vertical acceleration demand signal is applied to the line 64 when vertical acceleration is required by the programme unit or by the terrain-following radar equipment. The "OR" gate selects the most positive vertical acceleration demand.

The signal on line 64 is combined in summing amplifier 66 with a signal on line 68 representing 1 g, to overcome the effect of gravity and with a signal in opposite polarity or phase from the vertical acceleration section 69 of an inertial guidance table, and the resultant signal is applied in parallel to the computer units 70 and 72, which also receive over lines 76 and 78 a speed signal derived from Pitot and static pressures measured by the Pitot static tube 74. The computing unit 70 continuously computes the expression $U^2/U_c^2$, in which U is the forward velocity of the aircraft and $U_c$ is the cruise speed, and the computer unit 72 continuously computes the expression $(1-U^2/U_c^2)$. The vertical acceleration demand signal passes through the two computing units in these proportions. The aerodynamic share of vertical acceleration demand, in the form of the output of unit 70, controls the pitch attitude in a manner to be described later. The engine share (the output of the unit 72) is fed to a resolver 80 on the shaft of the nozzle servo 82.

The flight programme unit 54 also provides on line 84 a signal representing the required speed $U_d$ of the aircraft. This signal is added in a summing amplifier 86 in opposite polarity or phase to a signal from the Pitot static tube 74 and the difference signal, representing a demand for horizontal acceleration, is again added in opposite polarity or phase in a summing amplifier 88 with a signal obtained from an accelerometer 90 mounted on the pitch gimbal of the inertial navigation system. The resulting horizontal acceleration error signal is fed to the resolver 80 on the nozzle servo shaft.

The purpose of the resolver on the nozzle servo shaft is to share the vertical and horizontal acceleration demands between the throttle servo 92 and to the nozzle servo 82 in proportions depending on the value of the nozzle angle at that moment. This assumes that the angle between the longitudinal axis of the aircraft and the horizontal axis is sufficiently small not to warrant resolution. During hovering the nozzle angle is small so that demands for horizontal acceleration are fed almost entirely to the nozzle servo through a cosine-generating device in the resolver 80, the portion of the signal from the amplifier 88 which passes through the sine-generating device of the resolver to a summing amplifier 94 in the throttle control circuit being very small. Also, during hovering, demands for vertical acceleration on line 96 are fed primarily to the summing amplifier 94 in the throttle circuit through a cosine-generating device in the resolver 80, the proportion of the vertical demand signal which is passed by the sine-generating device to a summing amplifier 96 in the nozzle control circuit being very small. The effect of this is that if horizontal acceleration is demanded when the aircraft is hovering the signal is first used to tilt the nozzle backwards. As soon as it does so, an acceleration signal begins to appear at the sine resolver and this is then passed to the throttle servo and thus the throttle is opened further to maintain lift. As the nozzle becomes more and more longitudinal, the horizontal acceleration signal is resolved to a greater extent through the sine resolver and to a less extent through the cosine resolver and horizontal acceleration is therefore controlled more by the throttle than by the nozzle angle. If a demand for vertical acceleration exists, the increasing nozzle angle causes a simultaneous reduction in that part of the vertical acceleration signal from line 96 which is resolved through the cosine resolver, causing a reduction in its demands to the throttle, and that part of the vertical acceleration signal which passes through the sine resolver is increased, causing an increase in its control of the nozzle servo. Near the cruise state when the nozzle is almost longitudinal, horizontal acceleration is controlled entirely by the throttle whilst any residual vertical acceleration signal is fed to the nozzle servo. Such an arrangement enables the aircraft to pass from the hovering condition to the condition of forward flight and back to the hovering condition in a smooth manner. In the cruise state there is sufficient speed for control to be achieved aerodynamically and the nozzles remain in the longitudinal position.

It is arranged that if the demands for vertical and horizontal acceleration are too much for the engine when combined, the demand for vertical acceleration is met rather than that for horizontal acceleration. This is done by a limiter 98 at the input to the throttle servo. When the throttle input signal exceeds a value for which the throttle would be in its fully open position, a signal is fed back through the limiting circuit and a sine-generating section of the resolver 80 to the summing amplifier 88 which controls the demand for longitudinal acceleration. The polarity or phase of this feedback signal is such as to diminish this demand. This device, combined with the proportioning system which divides the vertical acceleration signal between the aerodynamic loop and the engine control system makes it impossible to cause the missile to drop to the ground.

The attitude control system will now be described. Dealing first with the aircraft yaw, at the lowest speeds, the aircraft which is being described cannot be controlled in yaw by the aerodynamics controls, but only by the yaw jets 100. At high speeds, the yaw jets become ineffective and the rudder servo 102 controlling the aerodynamic rudder surface takes over. This automatic change-over is made use of in the autopilot to change from the heading control, used during hover, to the control in yaw used at high speed merely to reduce sideslip. No switching is provided to effect the change-over. Two yaw-control loops are permanently inserted and the appropriate loop takes charge at the appropriate time simply because of the effectiveness of its controls at the existing aircraft speed. At hover speeds, the heading of the aircraft need not be in the direction of the relative wind. In fact it may need to be in the direction of the axis of a lorry or ship, for example, on which the aircraft is landing. The loop controlling the yaw jets for the hover phase includes a summing amplifier 104 which subtracts from the heading demand signal $\psi_D$ on line 106 a feedback signal on line 108 derived from the yaw section 110 of the inertia guidance table. A signal from the yaw rate gyro 112 is also subtracted in the summing amplifier in order to stabilise the loop.

At high speeds it is only necessary to point the aircraft axis in such a direction that the sideslip is zero. For this purpose a signal from a sideslip accelerometer 114 is applied through a summing amplifier 116 to the rudder servo 102, which has a feedback loop 118. The signal from the yaw rate gyro 112 is added in the summing amplifier 116 to give extra stability.

Pitch control is similar to yaw control in that two loops are provided, one for hover and the other for cruise. As in yaw control, these loops are permanently connected without provision for switching from one to the other, each being effectively only at the appropriate time.

For the hover phase, when the required pitch attitude is approximately equal to that needed to pull 1 g at cruise speed, the pitch jets 120 are controlled by the output signal from a summing amplifier 122 in which a signal representing the actual pitch attitude, obtained from the pitch section 124 of the inertia guidance table, is subtracted, together with a stabilising signal from the pitch rate gyro 126 from a signal on line 128 representing the required pitch angle $\theta_D$.

As mentioned earlier, the pitch attitude is used to control vertical acceleration during cruise. The output of the computer unit 70 is applied through a summing amplifier 130, in which the signal from the pitch rate gyro 126 is subtracted, equally to the servos 132 and 134 controlling the port and starboard elevons. The actuation of these elevons result in a change in pitch attitude.

Demands for lateral acceleration are interpreted as demands for change of roll angle, both for hover and cruise at constant altitude. If negative vertical acceleration is required during the application of lateral acceleration, the lateral control becomes reversed in sense. It is assumed that in general such requirements will be so brief that the navigating system will not be upset.

The roll control is the same whether the aircraft is cruising or hovering. A signal from the programme unit 9 representing the required roll angle is applied through a line 136 and a summing amplifier 138, in which the roll angle signal from the roll section 140 of the inertia guidance table is subtracted from it, to the summing amplifier 142, in which a stabilising signal from the roll rate gyro 144 is subtracted from it. The output of the summing amplifier 142 is applied to both the roll jet vanes 146 and is applied differentially to the port and starboard elevon servos 132 and 134. The gimbals of the roll section 140 of the inertial guidance table are arranged so that the roll angle will be the rotation of the aircraft about its no-lift axis. With this arrangement, the aircraft will not tend to lose height when it is put into a steeply banked turn.

We claim:

1. An aircraft powered by a jet engine with a rotatable nozzle, including a throttle for said engine and separate controls for said throttle and said nozzle, means for computing vertical and horizontal acceleration demands, and an adjustable proportioning means connected to receive vertical and horizontal acceleration demands from said computing means and to apply each of said demands partly to said throttle control and partly to said nozzle control, and a connection between said nozzle and said proportioning means for adjusting the latter in accordance with the nozzle angle, whereby in the hover condition horizontal acceleration is achieved predominantly by alteration of the nozzle angle and vertical acceleration by increasing the thrust and near to and at cruising speed horizontal acceleration is achieved predominantly by variation of thrust and vertical acceleration predominantly by variation of the nozzle angle.

2. An aircraft according to claim 1, in which said proportioning means is a sine-cosine resolver arranged to apply demands for horizontal acceleration to said throttle and nozzle controls in proportion to the sine and cosine of the nozzle angle, respectively, and to apply demands for vertical acceleration to said throttle and nozzle controls in proportion to the cosine and sine of the nozzle angle, respectively.

3. An aircraft according to claim 1 including yaw jets and a rudder and first and second yaw control loops both permanently in operation and controlling said yaw jets and the aircraft rudder respectively, said two loops becoming more effective and less effective respectively as the speed of said aircraft decreases.

4. An aircraft according to claim 1 including a pair of elevons and first and second permanently connected pitch control loops, said first loop controlling a set of pitch jets and said second loop controlling the angle of said elevons, said two loops becoming more effective and less effective respectively as speed of said aircraft decreases.

5. An aircraft according to claim 1 including port and starboard elevons and roll jet vanes, in which a roll angle control signal is applied to both said roll vanes and is applied differentially to controls for said port and starboard elevons.

References Cited in the file of this patent
UNITED STATES PATENTS
3,030,053    Smith _____ Apr. 17, 1962
FOREIGN PATENTS
226,135    Australia _____ Dec. 23, 1959